United States Patent Office 2,864,701
Patented Dec. 16, 1958

2,864,701

STABILIZED PANTOTHENIC ACID COMPOSITIONS

Raymond La Pierre, Iselin, N. J., assignor to Merck & Co., Inc., Rahway, N. J., a corporation of New Jersey No Drawing. Application April 30, 1954
Serial No. 426,938

4 Claims. (Cl. 99—2)

This invention is concerned generally with the stabilization of vitamins. More particularly, it relates to the stabilization of the pantothenic acid component in vitamin feed supplement compositions and in vitamin enriched animal feedstuffs.

In recent years, the supplementation of animal feedstuffs with various vitamins and other growth-promoting agents has become common practice among feed manufacturers. The vitamin compositions provided for this purpose ordinarily contain one or more of the essential vitamins, riboflavin, niacin, choline chloride and salts of pantothenic acid, admixed with an edible organic carrier such as fermentation residues, distillers' dried grains, wheat middlings, and the like. Although such vitamin feed supplement compositions have been widely accepted by feed manufacturers, it has been observed that the pantothenic acid component of such compositions is relatively unstable. Thus, under relatively mild storage conditions in sealed containers at temperatures common to northern warehouses (75–80° F.) losses range from 12% at four weeks to about 30% at twelve weeks. To compensate for this rapid decrease in the content of the pantothenic acid component of such compositions, it has been the practice to add up to a 25% overage of this vitamin, but even this excess has failed to insure the labeled potency of the vitamin composition, with respect to the pantothenic acid component, at the time of consumption. Accordingly, these prior art vitamin compositions were lacking in the same way as the animal feeds that such compositions were designed to supplement, since the vitamin supplements, like the feeds, were of uncertain composition and were frequently deficient in this essential dietary factor.

In accordance with the present invention, the pantothenic acid component of any improved vitamin compositions is stabilized by incorporating in the compositions a small amount of a water-soluble alkalizing agent of the group consisting of alkali metal carbonates and alkali metal bicarbonates. The vitamin compositions thus obtained, as well as the feedstuffs supplemented with such compositions, have been found to retain their original content of the pantothenic acid component for prolonged periods under normal storage conditions. Accordingly, the need for overage of the pantothenic acid component in these improved vitamin compositions is eliminated, and the labeled potency of the vitamin composition, with respect to said pantothenic acid component, is guaranteed at the time of consumption.

The vitamin compositions utilized for the supplementation of animal feedstuffs ordinarily include a major proportion of an edible organic substance as carrier admixed with one or more of the essential vitamins including the pantothenic acid compound. The edible organic substances most commonly used as carriers are corn distillers' dried grains, wheat distillers' dried grains, rye distillers' dried grains, wheat shorts, starch, farina, rye grains, ground rice, corn mash, soya meal and flour. The vitamin composition comprising such edible organic carrier and pantothenic acid compound are stabilized in accordance with my invention by incorporating in such composition an alkali metal carbonate or alkali metal bicarbonate such as sodium carbonate, potassium carbonate, sodium bicarbonate or potassium bicarbonate, in an amount sufficient to adjust the pH of said composition within the range of about 6 to 8, preferably a pH of about 7.0. The alkali metal carbonate or alkali metal bicarbonate can be incorporated in the form of a fine powder and intimately mixed with the vitamin composition or, if desired, the vitamin composition can be sprayed with a water solution containing the required amount of the alkalizing agent or alternatively the vitamin composition can be slurried in an aqueous solution containing an amount of an alkali metal carbonate or alkali metal bicarbonate sufficient to bring the pH of the resulting slurry within the desired limits.

As indicated hereinabove, the amount of alkalizing agent should be sufficient to adjust the pH within the range of about 6 to 8 and this amount will vary depending upon the particular edible organic carrier, the other vitamins present in the other vitamin composition, and the alkalizing agent employed. However, vitamin compositions having a pH within the prescribed range of 6 to 8 are ordinarily obtained by incorporating in the composition between about 1% and 5% of the alkali metal carbonate or alkali metal bicarbonate alkalizing agent. Utilizing my preferred vitamin composition wherein corn distillers' dried grains are utilized as the edible organic carrier, I have found that the pH of the resulting vitamin composition can ordinarily be adjusted within the preferred range by incorporating in the composition from about 3.2% to about 3.7% of an alkali metal carbonate such as sodium carbonate.

The following example illustrates a method of carrying out the present invention but it is to be understood that this example is given for purposes of illustration and not of limitation.

*Example 1*

A control vitamin composition, utilizing corn distillers' dried grains as the edible organic carrier and having the following composition, was prepared:

| | G. |
|---|---|
| Calcium pantothenate | 4.0 |
| Riboflavin | 2.0 |
| Niacin | 6.0 |
| Choline chloride | 20.0 |
| Corn distillers' dried grains to make 1 lb. | |

The corn distillers' dried grains was passed through a 60 mesh screen and the fines thus collected were thoroughly mixed with calcium pantothenate, riboflavin, niacin, and choline chloride. This mixture (premixed) was then thoroughly mixed with the coarse portion of the corn distillers' dried grains, and the mixture thus obtained was pulverized and packaged. The pH of this control vitamin composition was about 4.

Two test vitamin compositions were prepared, each of which was identical to the control except that one contained 3% sodium bicarbonate and the other contained 3.5% sodium carbonate in addition to the other components. The pH of each of these test vitamin compositions was within the range of 6 to 8. Samples of the control vitamin composition and of each of the test vitamin compositions were separately placed in closed containers and the containers stored at a temperature of about 75–80° F. for a period of four weeks. At the end of this storage period the samples were analyzed for their content of calcium pantothenate, and the value thus obtained was subtracted from the calcium pantothenate originally present in each sample at the beginning of the storage period. The differences thus obtained, which were expressed as a percentage loss of calcium pantothenate, are set forth in the following table:—

| Sample | Alkalizing Agent and Amount | Storage Time in Weeks | Percent Loss of Calcium Pantothenate |
|---|---|---|---|
| Control Composition | None | 4 | 12 |
| Test Composition 1 | 3% Sodium Bicarbonate | 4 | 0 |
| Test Composition 2 | 3.5% Sodium Carbonate | 4 | 0 |

The foregoing experimental results demonstrate that, after four weeks' storage in closed containers at temperatures common to northern warehouses, the control vitamin composition showed a 12% loss of calcium pantothenate, whereas, under identical storage conditions, both of the test vitamin compositions supplemented with 3% sodium bicarbonate and 3.5% sodium carbonate respectively, showed no loss of calcium pantothenate whatsoever.

Instead of utilizing calcium pantothenate in the foregoing vitamin compositions, I can employ other salts of pantothenic acid such as potassium pantothenate or sodium pantothenate, as well as free pantothenic acid itself. In place of the corn distillers' dried grains, I can use other edible organic carriers such as those specifically recited in column 1, lines 67 to 71, hereinabove. In place of the sodium bicarbonate and sodium carbonate used in the present example, I can also use other alkali metal carbonates such as potassium carbonate or other alkali metal bicarbonate such as potassium bicarbonate. The amount of alkali metal carbonate or alkali metal bicarbonate used varies depending on the edible organic carrier, since a sufficient amount of the alkalizing agent must be used to adjust the pH of the vitamin composition to within the range of 6 to 8. Where the vitamin composition contains large amounts of acidic vitamins such as niacin, proportionately larger amounts of the alkali metal carbonate or alkali metal bicarbonate alkalizing agent must necessarily be employed.

Various changes and modifications may be made in carrying out the present invention without departing from the spirit and scope thereof. Insofar as these changes and modifications are within the purview of the annexed claims, they are to be considered as part of my invention.

I claim:

1. A vitamin composition containing a pantothenic acid compound, adapted for the supplementation of animal feeds and characterized as having enhanced stability with respect to the pantothenic acid component, which comprises a salt of pantothenic acid, an edible organic carrier, and between about 1% and 5% of an alkali metal carbonate, the amount of said metal carbonate being sufficient to adjust the pH of said composition within the range of about 6 to 8.

2. A vitamin composition containing a pantothenic acid compound, adapted for the supplementation of animal feeds and characterized as having enhanced stability with respect to the pantothenic acid component, which comprises a salt of pantothenic acid, an edible organic carrier, and between about 1% and 5% of sodium carbonate, the amount of said metal carbonate being sufficient to adjust the pH of said composition within the range of about 6 to 8.

3. A vitamin composition containing calcium pantothenate, adapted for the supplementation of animal feeds and characterized as having enhanced stability with respect to the calcium pantothenate component, which comprises an edible organic carrier comprising corn distillers' dried grains, calcium pantothenate and about 3.5% based on the weight of said composition of sodium carbonate.

4. The method of stabilizing the calcium pantothenate component of a vitamin feed supplement composition containing calcium pantothenate in conjunction with an edible organic carrier comprising corn distillers' dried grains, which comprises incorporating about 3.5% of sodium carbonate in said composition.

References Cited in the file of this patent

UNITED STATES PATENTS

| | | |
|---|---|---|
| 2,406,741 | Compton et al. | Sept. 3, 1946 |
| 2,512,537 | Zellers | June 20, 1950 |
| 2,611,702 | Potishman | Sept. 23, 1952 |
| 2,668,749 | McHan | Feb. 9, 1954 |
| 2,685,517 | Dunmire | Aug. 3, 1954 |